United States Patent
Sin

(10) Patent No.: US 11,703,349 B2
(45) Date of Patent: Jul. 18, 2023

(54) NAVIGATION APPARATUS AND METHOD FOR PROVIDING INDIVIDUALIZATION MAP SERVICE THEREOF

(71) Applicants: Hyundai Motor Company, Seoul (KR); Kia Motors Corporation, Seoul (KR)

(72) Inventor: Geun Ok Sin, Jeollabuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 32 days.

(21) Appl. No.: 16/943,187

(22) Filed: Jul. 30, 2020

(65) Prior Publication Data

US 2021/0140780 A1 May 13, 2021

(30) Foreign Application Priority Data

Nov. 11, 2019 (KR) .......................... 10-2019-0143692

(51) Int. Cl.
| | |
|---|---|
| *G01C 21/00* | (2006.01) |
| *G01C 21/36* | (2006.01) |
| *G06F 18/24* | (2023.01) |
| *G06V 20/56* | (2022.01) |
| *G01C 21/34* | (2006.01) |

(52) U.S. Cl.
CPC ..... *G01C 21/3848* (2020.08); *G01C 21/3492* (2013.01); *G01C 21/3605* (2013.01); *G01C 21/3635* (2013.01); *G06F 18/24* (2023.01); *G06V 20/56* (2022.01)

(58) Field of Classification Search
CPC ............ G01C 21/3605; G01C 21/3492; G01C 21/3635; G06K 9/6267; B60W 40/06; G06Q 50/30; G08G 1/0968
See application file for complete search history.

(56) References Cited

U.S. PATENT DOCUMENTS

| | | | | |
|---|---|---|---|---|
| 2002/0052685 | A1* | 5/2002 | Kamiya | G01C 21/36 |
| | | | | 701/408 |
| 2003/0018428 | A1* | 1/2003 | Knockeart | G08G 1/096861 |
| | | | | 342/357.31 |
| 2009/0171559 | A1* | 7/2009 | Lehtiniemi | G01C 21/20 |
| | | | | 705/7.34 |
| 2010/0332315 | A1* | 12/2010 | Kamar | G06Q 30/0254 |
| | | | | 705/14.46 |
| 2016/0047672 | A1* | 2/2016 | Sachdev | G01C 21/3423 |
| | | | | 701/438 |
| 2018/0188045 | A1* | 7/2018 | Wheeler | G06V 20/64 |
| 2019/0078896 | A1* | 3/2019 | Zhu | G08G 1/0145 |
| 2020/0298853 | A1* | 9/2020 | Bast | G08G 1/166 |

FOREIGN PATENT DOCUMENTS

| | | | |
|---|---|---|---|
| KR | 200328847 | Y1 | 10/2003 |
| KR | 101539217 | B1 | 7/2015 |

\* cited by examiner

*Primary Examiner* — Jess Whittington
*Assistant Examiner* — Terry C Buse
(74) *Attorney, Agent, or Firm* — Slater Matsil, LLP

(57) ABSTRACT

A navigation apparatus and a method for providing an individualization map service of the navigation apparatus are provided. The navigation apparatus includes a detector configured to sense a vehicle state and a travelling environment during travelling, and a processor configured to recognize a drive context based on the vehicle state and the travelling environment, and to make an individualization map to be serviced based on the recognized drive context.

20 Claims, 4 Drawing Sheets

NAVIGATION APPARATUS AND METHOD FOR PROVIDING INDIVIDUALIZATION MAP SERVICE THEREOF

CROSS-REFERENCE TO RELATED APPLICATIONS

This application claims priority to Korean Patent Application No. 10-2019-0143692, filed in the Korean Intellectual Property Office on Nov. 11, 2019, which application is hereby incorporated herein by reference.

TECHNICAL FIELD

The present disclosure relates to a navigation apparatus and a method for providing an individualization map service thereof.

BACKGROUND

In general, a navigation apparatus determines a present position of a vehicle, and searches for the optimal route to a destination based on map data previously stored in a memory. In addition, the navigation apparatus may provide the optimal route to the destination, based on real-time traffic data collected through a communication network. Such a conventional navigation apparatus provides only the same route based on the same traffic information and the same map information to all users instead of providing a map suited to the needs of the users.

SUMMARY

Embodiments of the present disclosure can solve problems occurring in the prior art while advantages achieved by the prior art are maintained intact.

An embodiment of the present disclosure provides a navigation apparatus, capable of recognizing a drive context by reflecting the needs of a user during travelling of a vehicle and making an individualization map to be serviced using the recognized drive context, and a method for providing an individualization map service thereof.

The technical problems able to be solved by embodiments of the present disclosure are not limited to the aforementioned problems, and any other technical problems not mentioned herein will be clearly understood from the following description by those skilled in the art to which the present disclosure pertains.

According to an embodiment of the present disclosure, a navigation apparatus includes a detector configured to sense a vehicle state and a travelling environment during travelling, and a processor configured to recognize a drive context based on the vehicle state and the travelling environment, and make an individualization map to be serviced based on the recognized drive context.

The processor decides registration of the drive context in the individualization map by determining whether to register the drive context in the individualization map.

The processor updates the individualization map by reflecting the drive context, when the drive context is determined to be registered in the individualization map.

The processor registers the drive context as an exceptional context, when the drive context is not determined to be registered in the individualization map.

The navigation apparatus further includes a user interface configured to receive a request for registering the drive context from a user, and the processor recognizes the drive context at a time point at which the request for registering the drive context occurs.

The processor classifies the drive context based on a preset classification reference and registers the drive context with a classification context in the individualization map.

The processor temporarily stores the drive context with a new classification context when the drive context is unable to be classified based on the preset classification reference.

The processor registers the temporarily stored drive context with the new classification context in the individualization map after the travelling is terminated.

The individualization map includes information on a position at which the drive context occurs and drive context information.

The detector senses the vehicle state and the travelling environment by using at least one of a vibration sensor, a weight sensor, a speed sensor, a steering angle sensor, an image sensor, and/or an electric control unit (ECU) which are mounted on a vehicle.

According to another embodiment of the present disclosure, a method for providing an individualization map service of a navigation apparatus includes recognizing a drive context based on a vehicle state and a travelling environment during travelling, and making an individualization map to be serviced, based on the recognized drive context.

The method further includes determining whether to register the drive context in the individualization map, after recognizing the drive context, and registering the drive context in the individualization map, when the drive context is determined to be registered in the individualization map.

The method further includes registering the drive context as an exceptional context, when the drive context is not determined to be registered in the individualization map, after recognizing the drive context.

The method further includes receiving a request for registering the drive context from a user, before recognizing the drive context.

The method further includes classifying the drive context based on a preset classification reference, after recognizing the drive context, selecting a classification context of classification contexts which are able to be mapped to the drive context, and registering the drive context with the selected classification context in the individualization map.

The method further includes temporarily storing the drive context with a new classification context when the drive context is unable to be classified based on the preset classification reference, and registering the temporarily stored drive context with the new classification context in the individualization map after the travelling is terminated.

The making of the individualization map to be serviced includes sensing a vehicle approaching a position at which a drive context registered in the individualization map occurs during travelling, recognizing a drive context when sensing the vehicle approaching the position at which the drive context occurs, determining whether the recognized drive context is matched to the registered drive context, maintaining the registered drive context in the individualization map when the recognized drive context is matched to the registered drive context, and displaying the recognized drive context on a map.

The method further includes deleting the registered drive context from the individualization map, when the recognized drive context is not matched to the registered drive context.

The individualization map includes information on a position at which the drive context occurs and drive context information.

The recognizing of the drive context includes sensing the vehicle state and the travelling environment by using at least one of a vibration sensor, a weight sensor, a speed sensor, a steering angle sensor, an image sensor, and/or an electric control unit (ECU) which are mounted on a vehicle.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
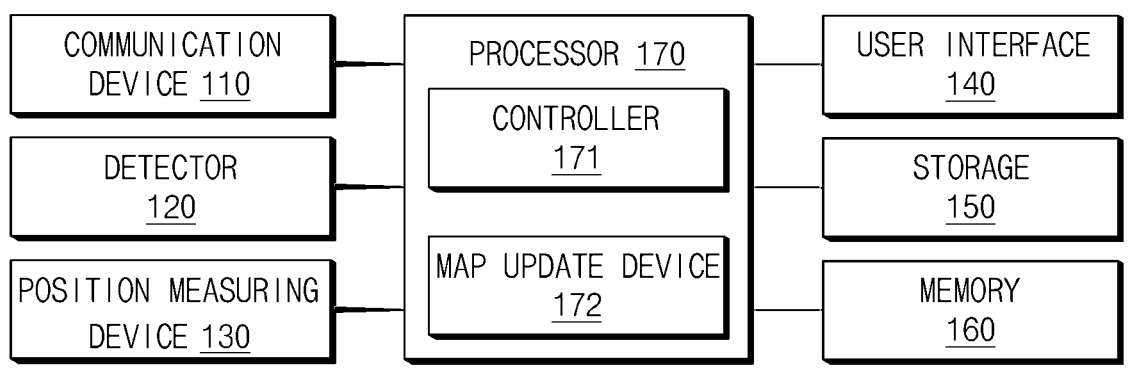
FIG. 1 is a block diagram illustrating a navigation apparatus, according to an embodiment of the present disclosure.

Hereinafter, some embodiments of the present disclosure will be described in detail with reference to the accompanying drawings. In adding the reference numerals to the components of each drawing, it should be noted that the identical or equivalent component is designated by the identical numeral even when they are displayed on other drawings. In addition, in the following description of embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined in the present application.

FIG. 1 is a block diagram illustrating a navigation apparatus, according to an embodiment of the present disclosure.

Referring to FIG. 1, a navigation apparatus 100 includes a communication device no, a detector 120, a position measuring device 130, a user interface 140, a storage 150, a memory 160, and a processor 170.

The communication device no makes wireless communication with an external device. A wireless communication technology may employ at least one of a wireless Internet technology including a wireless LAN (WLAN; Wi-Fi), a wireless broadband (Wibro), or World Interoperability for Microwave Access (WiMax), a short-range communication technology including Bluetooth, ZigBee, ultra wideband (UWB), radio frequency identification (RFID), or infrared data association (IrDA), a mobile communication technology including Code Division Multiple Access (CDMA), Global System for Mobile communication (GSM), Long Term Evolution (LTE), or International Mobile Telecommunication (IMT)-2020, and/or a vehicle to everything (V2X) technology such as Vehicle to Vehicle (V2V), Vehicle to Infrastructure (V2I), or Vehicle-to-Nomadic Devices (V2N).

The communication device no may receive real-time transportation information and/or real-time weather information from a traffic center and/or a weather center. The communication device no may receive map data (navigation map) from a navigation service server.

The detector 120 senses a vehicle state and/or a travelling environment using various sensors and an electric control unit (ECU). The detector 120 collects data using various sensors and an electric control unit (ECU) and senses a vehicle state and a travelling environment based on the collected data. In this case, the various sensors may include at least one of a vibration sensor, a weight sensor, a speed sensor, a steering angle sensor, an image sensor, and/or a distance sensor. The ECU may include an Engine Management System (EMS), an Electronic Stability Control (ESC), a Traction Control System (TCS), and/or an Antilock Brake System (ABS).

The position measuring device 130 measures the present position (a vehicle position) of the navigation apparatus 100. The position measuring device 130 may measure the position using at least one of positioning technologies such as a global positioning system (GPS), dead reckoning (DR), a differential GPS (DGPS), and/or a carrier phase differential GPS (CDGPS).

The user interface 140, which is to interact with a user, may include an input device and an output device. The user interface 140 may receive a user input through an input device or may output a progressing situation and/or result according to the operation of the processor 170 to the output device. The input device may be, for example, a keyboard, a keypad, a button, a switch, a touch pad, a touch screen, a microphone, and/or a camera. The output device may use a display, a speaker and/or a tactile signal output.

The user interface 140 receives a request for registering a drive context from a user and transmits the request to the processor 170. In addition, the user interface 140 may display a vehicle position and a driving route on a display screen based on map data.

The storage 150 may store, in the form of a database (DB), individualization map information, that is, an individualization map. The storage 150 may store an exceptional context. In other words, the storage 150 may include an individualization map DB and an exceptional context DB. The storage 150 may be implemented with at least one of storage media (recording media) including a flash memory, a hard disk, a secure digital card (SD card), a detachable disk, and a web storage.

In addition, the storage 150 may store map data (map information) received through the communication device no. The map data may be updated automatically at a specific cycle through the communication device 110, or manually by a user.

The memory 160 may store software programmed such that the processor 170 performs a preset operation. The memory 160 may temporarily store input data and/or output data based on the operation of the processor 170. The memory 160 may store a program to make an individualization map or to update the individualization map. The memory 160 may be implemented with at least one of storage media (recording media) such as a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), and a register.

The processor 170 controls the overall operation of the navigation apparatus 100. The processor 170 may include at least one of an Application Specific Integrated Circuit (ASIC), a Digital Signal Processor (DSP), Programmable Logic Devices (PLDs), Field Programmable Gate Arrays (FPGAs), a Central Processing unit (CPU), microcontrollers, and/or microprocessors.

The processor 170 may include a controller 171 and a map update device 172. The controller 171 recognizes the drive context based on the vehicle state and the travelling environment (including a road environment) sensed by the detector 120, links the recognized drive context to the position information, and confirms, with a user, whether to register the link between the recognized drive context and the position information in the individualization map. The map update device 172 makes the individualization map by combining the recognized drive context and the position information, under the instruction of the controller 171. Although the present embodiment discloses that the controller 171 and the map update device 172 are implemented in the form of one processor 170, the controller 171 and the map update device 172 may be implemented separately in the form of individual processors.

The processor 170 may operate in an automatic mode or a manual mode to make the individualization map.

First, the operation of the processor 170 in the automatic mode will be described below.

The processor 170 collects information on the vehicle state and the travelling environment through the detector 120 during travelling. The detector 120 senses the vehicle state and the travelling environment using various sensors mounted in a vehicle and/or the ECU and transmits the vehicle state and the travelling environment, which are sensed, to the processor 170. In this case, the vehicle state (e.g., a residual amount of fuel) and the travelling environment (e.g., the road state or weather) are factors of exerting an influence on travelling.

The processor 170 recognizes the drive context based on the vehicle state and the travelling environment. For example, the processor 170 recognizes the drive context as a context in which the vehicle travels on a broken road when vibration is sensed to be a threshold value or more through a vibration sensor. In this case, the drive context may correspond to at least one of a broken road section travelling context, a load drop context, a dangerous section travelling context, or an abnormal travelling context (quick stop, sudden deceleration, sudden acceleration, abnormal steering), and/or a shock sensing context.

The processor 170 confirms, with the user, whether to register the recognized drive context in the individualization map. In other words, the processor 170 may output a query (text and/or voice) of asking whether to store a position (drive context recognition position) at which the drive context is recognized, and information on the drive context in the individualization map DB, through the user interface 140. For example, the processor 170 may display, on a display screen, a query message in a pop-up form, and may convert the query message into a voice signal to be output to a speaker. Thereafter, the processor 170 receives a response of the user to the query through the user interface 140, and registers the recognized drive context in the individualization map depending on the received user response. In other words, the processor 170 may register information on a position (the drive context recognition position) at which the obtained drive context occurs and information (e.g., the type of the drive context) on the drive context, when the positive response (that is, registration) is received from the user.

Meanwhile, the processor 170 registers the recognized drive context as an exceptional context, when a negative response is received from the user. When the drive context registered as the exceptional context is recognized, the processor 170 may not output an alarm notifying that the relevant drive context is recognized.

For example, the processor 170 recognizes the present drive context as the broken road travelling context or unregistered bump section travelling context, when the vibration having the threshold value or more is sensed through the vibration sensor of the detector 120. Thereafter, the processor 170 confirms, with the user, whether to register the present drive context in the individualization map. The processor 170 registers the drive context in the individualization map depending on the user response received through the user interface 140. In other words, the processor 170 stores, in the individualization map DB, the information on the drive context recognition position and the drive context information.

For another example, the processor 170 recognizes the present drive context as the load drop context, when sensing the variation in weight through a weight sensor. The processor 170 outputs the notification such that the load drop context is recognized by the user. In addition, the processor 170 registers, in the individualization map, position coordinates, which are measured by the position measuring device 130, of a load drop position and the load drop context.

For still another example, the processor 170 recognizes the present drive context as an abnormal travelling context when sensing a vehicle speed (sudden acceleration or sudden deceleration) of a reference speed or more through a speed sensor or when sensing the abnormal steering state through the steering angle sensor. The processor 170 confirms, with the user, whether to register the recognized drive context into the individualization map.

As another example, the processor 170 may obtain weather information through the communication device 110 to check weather conditions, such as rain, snow, strong winds, fine dust, and fog. The processor 170 recognizes the dangerous section travelling context when a sudden change in the steering angle is sensed by the steering angle sensor in the context that it rains or snows. In addition, when sensing a sudden change in the position of the vehicle based on the position information measured by the position measuring device 130 in a context where a strong wind blows on the bridge in which the vehicle is driving, the processor 170 may recognize the present drive context as the dangerous section travelling context. Alternatively, when sensing a change in the speed of the vehicle in the context that the fine dust and/or the fog is severe and a fog light is turned on, the processor 170 may recognize the present context as the dangerous section travelling context. When recognizing the dangerous section travelling context, the processor 170 may confirm, with the user, whether to register the present drive context in the individualization map when recognizing the dangerous section travelling context, and may process a registration procedure.

Next, the operation of the processor 170 in the manual mode will be described below.

The processor 170 receives the request for registering a drive context from the user interface 140 during travelling. The user interface 140 transmits, to the processor 170, data (for example, a command) corresponding to a user input when the user input (voice or touch manipulation) is sensed.

The processor 170 recognizes the drive context through the detector 120 when receiving the request for registering the drive context. The processor 170 classifies the drive context based on a preset classification reference (for example, a distance and/or a visiting count). The preset classification reference may be previously set for a system designer and/or a user. In other words, the processor 170 classifies the type of the drive context based on the preset classification reference.

The processor 170 determines whether the drive context is able to be classified, based on the preset classification reference. In other words, the processor 170 determines that the drive context is able to be classified based on the preset classification reference, when there is present at least one classification context (the type of the context) to be mapped to the drive context. Meanwhile, the processor 170 determines that the drive context is unable to be classified based on the preset classification reference, when there is absent a classification context to be mapped to the drive context.

The processor 170 selects a classification context to be mapped to the drive context, which is among classification contexts that is able to be mapped to the drive context, when the drive context is able to be classified. The processor 170 recommends at least one classification context in order of contexts having higher probability to be mapped to the drive context. The processor 170 may select at least one of classification contexts recommended depending on the user input through the user interface 140.

The processor 170 registers the drive context with the selected classification context in the individualization map. In other words, the processor 170 stores, in the individualization map DB, the drive context recognition position, and information on the drive context.

The processor 170 temporarily stores the drive context with the new classification context in the memory 160 when the drive context is unable to be classified based on the preset classification reference. Thereafter, the processor 170 registers, into the individualization map, the temporarily stored drive context with the new classification context, when the driving is terminated. In other words, the processor 170 stores, in the storage 150, information (position information, classification context, and a notification condition) on the drive context temporarily stored in the memory 160. The new classification context may be defined by the user.

For example, when a user enters a wrong road during travelling, the processor 170 may request a relevant position to be registered in the individualization map and may set a notification condition. For example, when multiple driveways for entrance are adjacent to each other on the highway, and thus incorrectly enter the driveway, the user may request registering the drive context, through voice or touch operation. The processor 170 may recognize the context of exit to the highway through the detector 120 and measure a relevant position through the position measuring device 130, when the request from the user is received. The processor 170 may recognize the present drive context as a highway exit context and may classify the highway exit context as "directions" based on the preset reference for the recommendation to the user, when the position is an interchange such as a junction. The processor 170 may receive a user response through the user interface 140 and may store, in the individualization map, the present drive context as "directions" based on the received user response. In this case, the processor 170 may set the notification condition. For example, the processor 170 may make settings to output a notification such as "Be careful about Driveway for Exit" when accessing 1 km from a previously registered position.

For another example, when a user has a satisfactory experience at a highway rest area and requests registering a drive context with respect to the relevant position, the processor 170 obtains position information of the rest area through the position measuring device 130 and recognizes the drive context as a rest area use context based on position information. The processor 170 may receive information on a relevant rest area, that is, a famous restaurant, a restroom state, a resting place, maintenance shop information, and/or gas station information, from a user through the user interface 140. In addition, the processor 170 may set a notification condition such as the access to a radius of 5 km from a rest area position or the access to the rest area during mealtime. The processor 170 registers the position of a rest area, rest area information (context information), and a notification condition into the individualization map.

For another example, the processor 170 may measure the position of a gas station or a charging station and recognize the drive context as a context for refueling or charging based on the information on the measured position, when a user is satisfied with a gas station or a charging station after visiting the gas station or the charging station and when the user requests registering a context for the position of the gas station or the charging station. The processor 170 may set, as the notification condition, the access to the radius of less than 5 km from the position of the gas station or the charging station or the access to the gas station or the charging station when a remaining amount of fuel or a battery is less than 20%, through the user interface 140. The processor 170 may classify the position of the gas station or the charging station, the drive context, or the notification condition as the classify context of 'gas station/charging station' and may register the classification in the individualization map.

The processor 170 senses a vehicle approaching a position at which the drive context registered into the individualization map occurs during travelling. The processor 170 recognizes the drive context when the vehicle enters a preset radius from the position at which the drive context is recognized. The processor 170 determines whether the recognized drive context is matched to a drive context registered into the individualization map. The processor 170 maintains the drive context in the individualization map, when the recognized drive context is matched to the registered drive context. The processor 170 displays the recognized drive context on a map of the navigation. Meanwhile, the processor 170 deletes the drive context from the individualization map, when the recognized drive context is not matched to the registered drive context.

Figure 2:
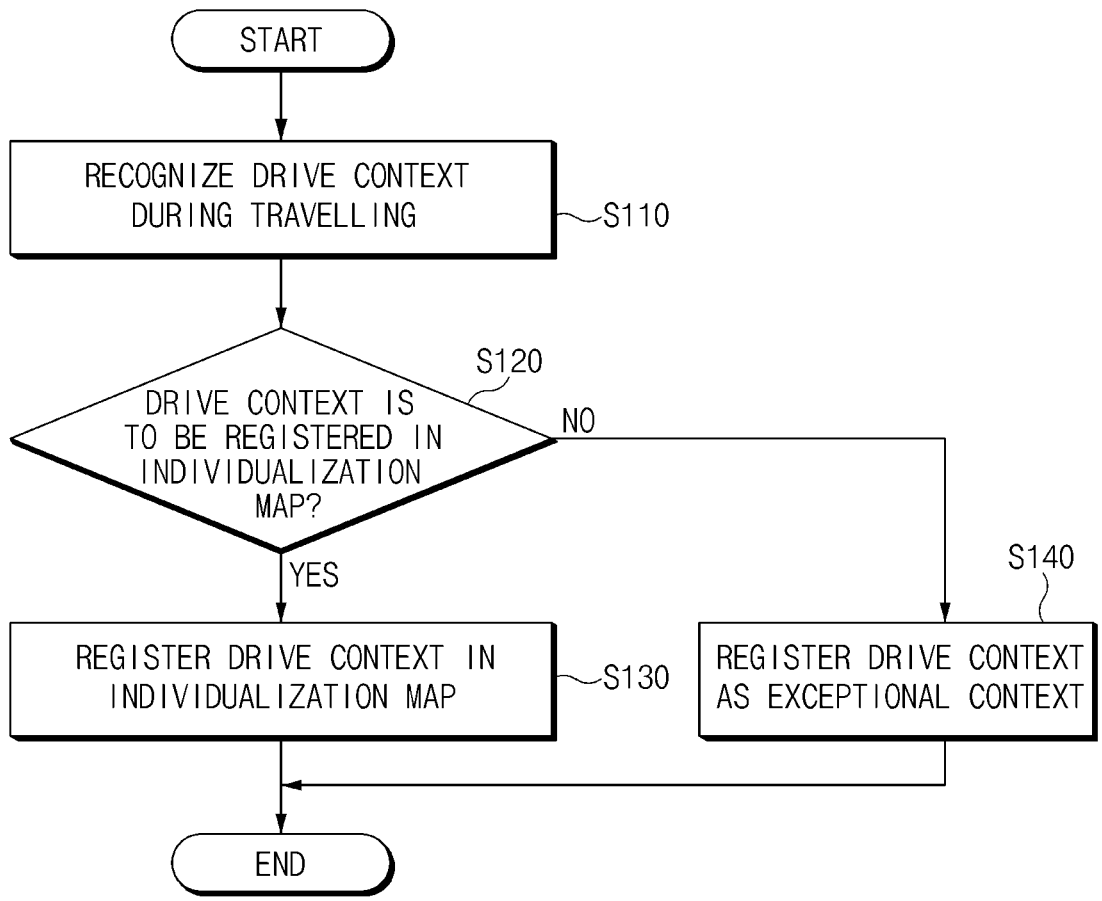
FIG. 2 is a flowchart illustrating a method for making an individualization map of a navigation apparatus, according to an embodiment of the present disclosure.

FIG. 2 is a flowchart illustrating a method for making an individualization map of a navigation apparatus, according to an embodiment of the present disclosure.

The processor 170 recognizes the drive context during travelling (Silo). The processor 170 senses the vehicle state and the travelling environment through the detector 120 during the travelling of the vehicle, and recognizes the drive context based on the sensed vehicle state and the travelling environment. The drive context is a context in which a factor exerted an influence on the travelling of the vehicle. For example, the processor 170 recognizes the present context as an abnormal travelling context when the sudden change in the steering angle is sensed by the steering angle sensor.

The processor 170 determines whether to register the recognized drive context in the individualization map (S120). The processor 170 outputs, on the user interface 140, a message for querying whether to store the recognized driving context in the individualization map DB, in the form recognized by a user, that is, the form of visible information and/or audible information. Thereafter, the processor 170 receives the user response through the user interface 140, and determines whether to store the recognized drive context in the individualization map DB, based on the received user response.

The processor 170 registers the drive context in the individualization map when it is determined that the recognized drive context is to be registered in the individualization map (S130). The processor 170 obtains information on a position at which the drive context occurs, from the position measuring device 130, and stores the combination of the obtained position information and the drive context information in the individualization map DB.

Meanwhile, the processor 170 registers the drive context as the exceptional context, when it is determined not to register the recognized drive context in the individualization map (S140). The processor 170 stores the combination of the drive context recognition position and the drive context information into an exceptional context DB.

Figure 3:
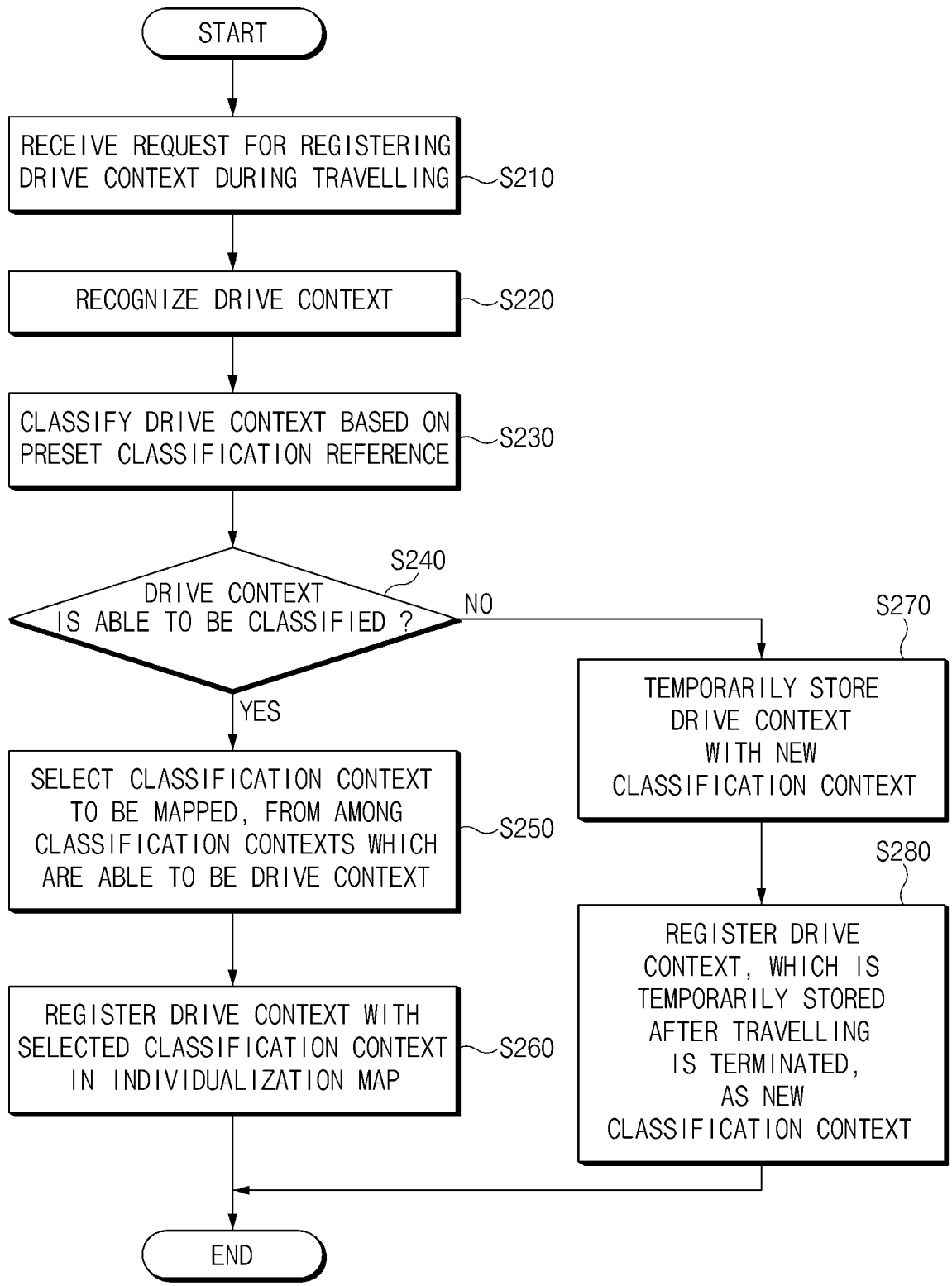
FIG. 3 is a flowchart illustrating a method for making an individualization map of a navigation apparatus, according to another embodiment of the present disclosure.

FIG. 3 is a flowchart illustrating a method for making an individualization map of a navigation apparatus, according to another embodiment of the present disclosure.

The processor 170 receives a request for registering a drive context from a user during the travelling (S210). The processor 170 may receive the request for registering the drive context through the user interface 140.

The processor 170 recognizes the drive context when receiving the request for registering the drive context (S220). The processor 170 collects data related to the vehicle state and the travelling environment through the detector 120 and recognizes the drive context based on the collected data. In this case, the processor 170 may measure a present position of the navigation apparatus 100 through the position measuring device 130.

The processor 170 classifies the drive context based on the preset classification reference (S230). For example, when the present drive context is a drive context of requiring fuel replenishment (refueling) or requiring the rest of the driver, the present drive context is classified as a drive context of requiring the visit to the gas station, requiring the visit to a drowsy shelter, or requiring the visit to a rest area.

The processor 170 determines whether the drive context is able to be classified (S240). In other words, the processor 170 determines whether there is a drive context to be mapped to the recognized drive context.

The processor 170 selects a classification context, which is to be mapped to the drive context, of classification contexts when the classification of the drive context is possible (S250). The processor 170 may select the classification context which is to be mapped of the classification contexts to be mapped to the recognized drive context. In this case, the processor 170 may select the classification context to be mapped to the recognized drive context depending on a user input through the user interface 140.

The processor 170 registers the drive context with the selected classification context in the individualization map (S260). For example, when the user selects the context of requiring the visit of the user to the rest area, the processor 170 may sore the recognized drive context into the individualization map DB, as the context of requiring the visit to the rest area.

The processor 170 temporarily stores the drive context with the new classification context when the drive context is unable to be classified based on the preset classification reference (S270). In this case, the processor 170 may arbitrarily determine and store the new classification context to be mapped to the drive context.

The processor 170 registers the drive context, which is temporarily stored after the travelling is terminated, as the new classification context (S280). The processor 170 may define the new classification context based on the user input received through the user interface 140.

Figure 4:
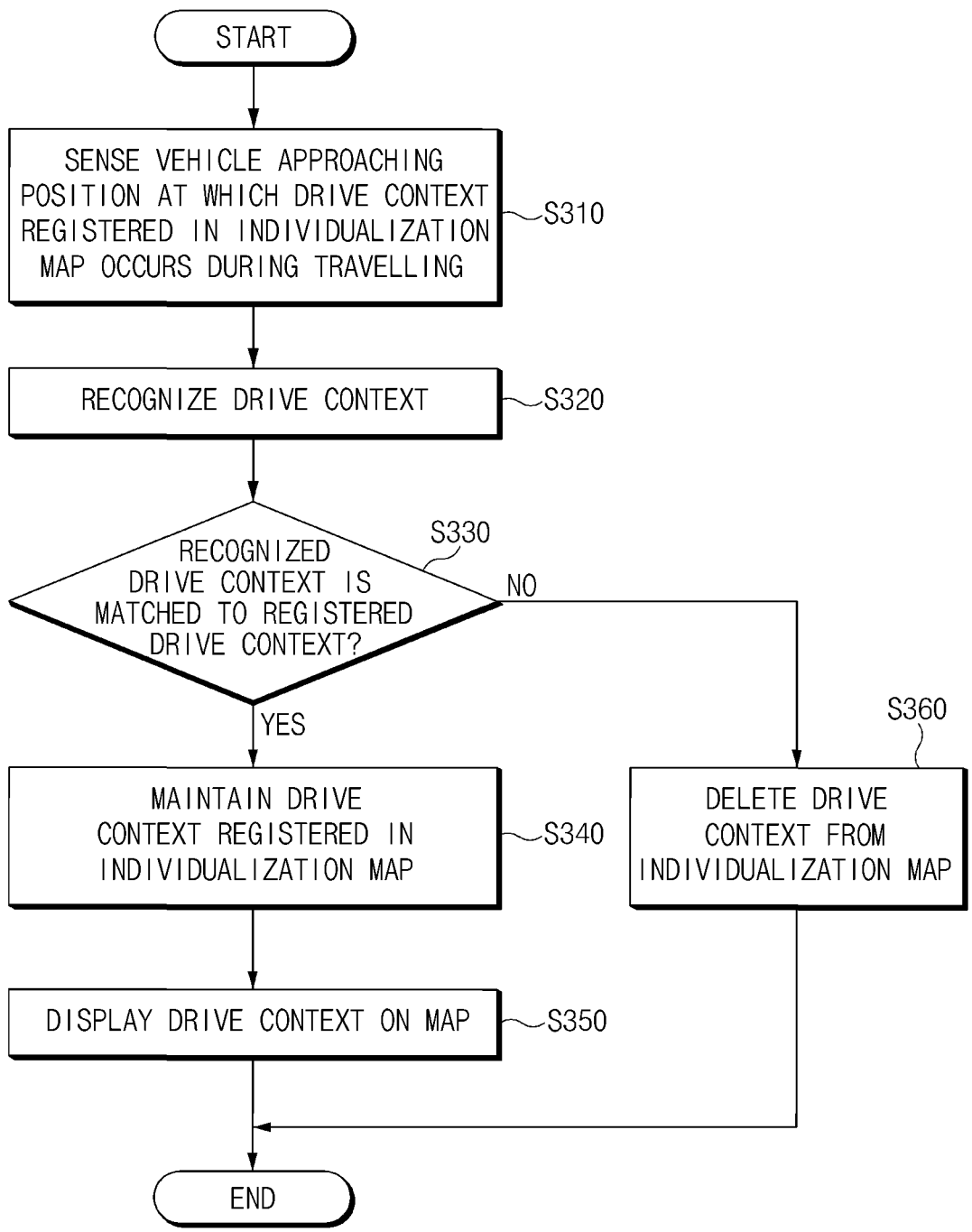
FIG. 4 is a flowchart illustrating a method for providing an individualization map service, according to an embodiment of the present disclosure.

FIG. 4 is a flowchart illustrating a method for providing an individualization map service in the navigation apparatus, according to an embodiment of the present disclosure.

The processor 170 detects a vehicle approaching a position at which a drive context registered in the individualization map occurs during travelling (S310). The processor 170 provides map information by linking the navigation map to the individualization map during travelling. In other words, the processor 170 may map the occurrence position of the drive context registered in the individualization map onto the navigation map to be output.

The processor 170 recognizes the drive context when the vehicle enters a preset radius from the position at which the drive context is recognized (S320). The processor 170 recognizes the drive context based on data collected through the detector 120.

The processor 170 determines whether the recognized drive context is matched to the registered drive context (S330).

The processor 170 maintains the drive context registered in the individualization map, when the recognized drive context is matched to the registered drive context (S340).

The processor 170 displays the recognized drive context on a map of the navigation (S350). The processor 170 outputs the drive context information by displaying the position of the recognized drive context through the mapping onto the navigation map.

The processor 170 deletes the drive context from the individualization map when the recognized drive context is not matched to the registered drive context (S360).

According to an embodiment, when a user wants to memorize a position at which the user feels uncomfortable in travelling, during driving, the processor 170 recognizes the drive context (caused by an external influence) based on information collected through the detector 120, classifies the recognized drive context to be transmitted to the user, and stores the drive context into the individualization map. Thereafter, when the user drives at the position stored in the individualization map, the processor 170 may provide a notification or an alarm to the user in advance, and may provide the better driving experience to the user.

In addition, according to embodiments of the present disclosure, when the user wants to record a specific position and/or context based on a position, the user may store various user experiences through the individualization map. For example, when a context that the user wants to record occurs, the record (the registration of the drive context) is requested through the user interface 140. The navigation apparatus 100 transmits, to the user, reference contexts (e.g., lane information, rest area information, an interchange, and a junction) associated with the position that the user wants to store, based on priorities. The user maps the reference contexts to the desired context information to be stored in the individualization map. Thereafter, when the vehicle passes through the same position stored in the individualization map again, a notification may be provided to the user in advance, thereby allowing the user to have an improved experience.

According to embodiments of the present disclosure, the drive context may be recognized by reflecting the needs of the user during travelling of the vehicle and the individualization map may be made using the recognized drive context to be serviced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A navigation apparatus comprising:
   a detector configured to sense a vehicle state and a travelling environment during travelling;
   a user interface configured to receive a response of a user; and
   a processor configured to:
      recognize a driving situation based on the vehicle state and the travelling environment;
      output a query to ask whether to store the driving situation in a personalized map;
      determine whether to store the driving situation in the personalized map based on the response of the user to the query;
      store the recognized driving situation in the personalized map in response to determining that the driving situation is to be stored in the personalized map;
      set a notification condition when storing the driving situation in the personalized map; and
      store the recognized driving situation as an exceptional context in response to determining that the driving situation is not to be stored in the personalized map, the exceptional context being defined as a situation in which the processor does not output a notification that the driving situation is recognized.

2. The navigation apparatus of claim 1, wherein the notification is an alarm.

3. The navigation apparatus of claim 1, wherein the processor is configured to recognize the driving situation at a time point at which a request for storing the driving situation occurs.

4. The navigation apparatus of claim 3, wherein the processor is configured to:
   classify the driving situation based on a preset classification reference; and
   store the driving situation with a classification context in the personalized map.

5. The navigation apparatus of claim 4, wherein the processor is configured to temporarily store the driving situation with a new classification context when the driving situation is unable to be classified based on the preset classification reference.

6. The navigation apparatus of claim 5, wherein the processor is configured to store the temporarily stored driving situation with the new classification context in the personalized map after the travelling is terminated.

7. The navigation apparatus of claim 1, wherein the detector is configured to sense the vehicle state and the travelling environment by using at least one of a vibration sensor, a weight sensor, a speed sensor, a steering angle sensor, an image sensor, or an electric control unit which is mounted on a vehicle.

8. A navigation apparatus comprising:
   a detector configured to sense a vehicle state and a travelling environment during travelling;
   a user interface configured to receive a response of a user; and
   a processor configured to:
      recognize a driving situation based on the vehicle state and the travelling environment;
      output a query to ask whether to store the driving situation in a personalized map, wherein the personalized map includes information on a position at which the driving situation occurs and driving situation information;
      determine whether to store the driving situation in the personalized map based on the response of the user to the query;
      store the recognized driving situation in the personalized map in response to determining that the driving situation is to be stored in the personalized map;
      set a notification condition when storing the recognized driving situation in the personalized map; and
      store the recognized driving situation as an exceptional context in response to determining that the driving situation is not to be stored in the personalized map, the exceptional context being defined as a situation in which the processor does not output a notification that the driving situation is recognized.

9. The navigation apparatus of claim 8, wherein the notification is an alarm.

10. The navigation apparatus of claim 8, wherein the processor is configured to recognize the driving situation at a time point at which a request for storing the driving situation occurs.

11. The navigation apparatus of claim 10, wherein the processor is configured to:
    classify the driving situation based on a preset classification reference; and
    store the driving situation with a classification context in the personalized map.

12. A method for providing an personalized map service of a navigation apparatus, the method comprising:
    recognizing a driving situation based on a vehicle state and a travelling environment during travelling;
    outputting a query to ask whether to store the driving situation in a personalized map;
    receive a response to the query;
    storing the recognized driving situation in the personalized map to when it is determined that the driving situation is to be stored in the personalized map based on the response to the query;
    setting a notification condition when storing the driving situation in the personalized map; and
    storing the recognized driving situation as an exceptional context when it is determined that the driving situation is not to be stored in the personalized map based on the response to the query, the exceptional context being defined as a situation in which the navigation apparatus does not output a notification that the driving situation is recognized.

13. The method of claim 11, wherein the notification is an alarm.

14. The method of claim 12, further comprising, before recognizing the driving situation, receiving a request for storing the driving situation from a user.

15. The method of claim 14, further comprising:
after recognizing the driving situation, classifying the driving situation based on a preset classification reference;
selecting a classification context of classification contexts which are able to be mapped to the driving situation; and
storing the driving situation with the selected classification context in the personalized map.

16. The method of claim 15, further comprising:
temporarily storing the driving situation with a new classification context when the driving situation is unable to be classified based on the preset classification reference; and
storing the temporarily stored driving situation with the new classification context in the personalized map after the travelling is terminated.

17. The method of claim 15, wherein making the personalized map to be serviced includes:

sensing a vehicle approaching a position at which the driving situation stored in the personalized map occurs during travelling;
recognizing the driving situation when sensing the vehicle approaching the position at which the driving situation occurs;
determining whether the recognized driving situation is matched to the stored driving situation;
maintaining the stored driving situation in the personalized map when the recognized driving situation is matched to the stored driving situation; and
displaying the recognized driving situation on a map.

18. The method of claim 17, further comprising:
deleting the stored driving situation from the personalized map, when the recognized driving situation is not matched to the stored driving situation.

19. The method of claim 12, wherein the personalized map includes information on a position at which the driving situation occurs and driving situation information.

20. The method of claim 12, wherein recognizing the driving situation includes sensing the vehicle state and the travelling environment by using at least one of a vibration sensor, a weight sensor, a speed sensor, a steering angle sensor, an image sensor, or an electric control unit which is mounted on a vehicle.

* * * * *